(12) United States Patent
Kim et al.

(10) Patent No.: US 11,095,171 B2
(45) Date of Patent: Aug. 17, 2021

(54) STATOR AND MOTOR COMPRISING SAME

(71) Applicant: LG INNOTEK CO., LTD., Seoul (KR)

(72) Inventors: Tae Ho Kim, Seoul (KR); Yong Chui Kim, Seoul (KR); Sun Ho Jo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 40 days.

(21) Appl. No.: 16/482,498

(22) PCT Filed: Feb. 6, 2018

(86) PCT No.: PCT/KR2018/001531
§ 371 (c)(1),
(2) Date: Jul. 31, 2019

(87) PCT Pub. No.: WO2018/147610
PCT Pub. Date: Aug. 16, 2018

(65) Prior Publication Data
US 2019/0356179 A1    Nov. 21, 2019

(30) Foreign Application Priority Data

Feb. 13, 2017   (KR) .................. 10-2017-0019599
Nov. 13, 2017   (KR) .................. 10-2017-0150612

(51) Int. Cl.
*H02K 1/12*        (2006.01)
*H02K 1/24*        (2006.01)
(Continued)

(52) U.S. Cl.
CPC ............... *H02K 1/12* (2013.01); *H02K 1/148* (2013.01); *H02K 1/24* (2013.01); *H02K 3/04* (2013.01);
(Continued)

(58) Field of Classification Search
CPC ............ H02K 1/12; H02K 1/148; H02K 1/24; H02K 3/04; H02K 3/34; H02K 16/04; H02K 2203/12; H02K 3/522
(Continued)

(56) References Cited

U.S. PATENT DOCUMENTS 4,967,464 A  *  11/1990  Stephens ................. H02K 3/18
                                                                    29/596
6,211,595 B1 *   4/2001  Nose ..................... G11B 19/2009
                                                                    310/164
(Continued)

FOREIGN PATENT DOCUMENTS

CN    101461120 A      6/2009
CN    108377043    *  8/2018
(Continued)

OTHER PUBLICATIONS

International Search Report in International Application No. PCT/KR2018/001531, filed Feb. 6, 2018.
(Continued)

*Primary Examiner* — Ahmed Elnakib
(74) *Attorney, Agent, or Firm* — Saliwanchik, Lloyd & Eisenschenk

(57) ABSTRACT

One embodiment relates to a stator unit and a motor comprising same, the stator unit comprising: a stator core; a coil wound around the stator core; and an insulator disposed between the stator core and the coil, wherein the stator core comprises a support part, and a coil winding part disposed on both side surfaces of the support part so as to protrude therefrom, wherein the support part and the coil winding part are disposed so as to form a cross shape. Accordingly, a coil space factor may be increased by using the cross-shaped stator core.

15 Claims, 18 Drawing Sheets

(51) Int. Cl.
*H02K 3/04* (2006.01)
*H02K 3/34* (2006.01)
*H02K 16/04* (2006.01)
*H02K 1/14* (2006.01)
*H02K 3/52* (2006.01)

(52) U.S. Cl.
CPC ............... *H02K 3/34* (2013.01); *H02K 16/04* (2013.01); *H02K 3/522* (2013.01); *H02K 2203/12* (2013.01)

(58) Field of Classification Search
USPC ... 310/216.036, 216.071, 216.079, 179, 194, 310/214, 215
See application file for complete search history.

(56) References Cited

U.S. PATENT DOCUMENTS

| | | | | |
|---|---|---|---|---|
| 7,439,713 | B2* | 10/2008 | Dooley | H02P 9/34 322/22 |
| 8,207,648 | B2* | 6/2012 | Li | H02K 1/146 310/267 |
| 8,653,714 | B2* | 2/2014 | Taniguchi | H02K 1/165 310/216.079 |
| 2010/0033043 | A1 | 2/2010 | Seki et al. | |
| 2011/0193444 | A1* | 8/2011 | Maruyama | H02K 3/522 310/215 |
| 2012/0121477 | A1* | 5/2012 | Ali | F01D 15/10 422/184.1 |
| 2013/0093276 | A1* | 4/2013 | Kim | H02K 16/00 310/114 |
| 2013/0154397 | A1* | 6/2013 | Sullivan | H02K 1/141 310/12.18 |
| 2013/0221770 | A1* | 8/2013 | Yokogawa | H02K 1/148 310/43 |
| 2014/0028143 | A1 | 1/2014 | Ishigami et al. | |
| 2015/0028727 | A1* | 1/2015 | Watanabe | H02K 9/08 310/60 A |
| 2016/0156255 | A1* | 6/2016 | Kim | H02K 3/325 310/208 |
| 2019/0356179 | A1* | 11/2019 | Kim | H02K 1/12 |

FOREIGN PATENT DOCUMENTS

| | | |
|---|---|---|
| JP | 10-307043 A | 11/1998 |
| JP | 2006-250867 A | 9/2006 |
| JP | 2007-327868 A | 12/2007 |
| JP | 2009-268231 A | 11/2009 |
| JP | 2017121158 * | 7/2017 |
| KR | 10-2012-00276 42 | 3/2012 |

OTHER PUBLICATIONS

Office Action dated Aug. 31, 2020 in Chinese Application No. 201880011627.3.
Supplementary European Search Report dated Nov. 2, 2020 in European Application No. 18751707.3.

* cited by examiner

STATOR AND MOTOR COMPRISING SAME

CROSS-REFERENCE TO RELATED APPLICATIONS

This application is the U.S. national stage application of International Patent Application No. PCT/KR2018/001531, filed Feb. 6, 2018, which claims the benefit under 35 U.S.C. § 119 of Korean Application Nos. 10-2017-0019599, filed Feb. 13, 2017; and 10-2017-0150612, filed Nov. 13, 2017; the disclosures of each of which are incorporated herein by reference in their entirety.

TECHNICAL FIELD

An embodiment relates to a stator and a motor including the same.

BACKGROUND ART

A motor is a device configured to obtain a rotating force by converting electrical energy to mechanical energy, and is widely used in a vehicle, a home appliance, an industrial apparatus, and the like.

FIG. 1 is a transverse sectional view illustrating a conventional motor 2.

Referring to FIG. 1, the motor 2 can include a housing 10, a shaft 20, a stator 30 disposed on an inner circumferential surface of the housing 10, a rotor 40 installed on an outer circumferential surface of the shaft 20, and the like. Here, the stator 30 of the motor 2 rotates the shaft 20 by causing an electrical interaction with the rotor 40 to induce rotation of the rotor 40. Accordingly, a driving force is generated in the motor 2.

Particularly, when the motor 2 is a three phase multi-pole motor, coils having a Phase 1, a Phase 2, and a Phase 3, respectively, are wound around teeth of the stator 30, and since currents flow through the coils, a rotating magnetic field is generated between the stator 30 and the rotor 40 to rotate.

Power supplied to the three phase multi-pole motor can have three phases, and the three phase multi-pole motor can be a motor having an inverter circuit connected to single phase power to autonomously rectify single phase AC power to DC, and can be controlled in three phases including the Phase 1, the Phase 2 and the Phase 3. Further, the three phase multi-pole motor is not limited to a particular motor, and for example, can be an induction motor or a synchronous motor. Here, the three phases can be referred to as a U phase, a V phase, and a W phase.

The stator 30 can include a yoke 31 and a plurality of teeth 32. Further, the teeth refer to the plurality of teeth 32.

Accordingly, a space in which the coils are wound can be formed between one tooth 32 and another tooth 32 disposed adjacent to the one tooth 32. Here, the space refers to a slot S.

As shown in FIG. 1, the slot S can be formed in a trapezoidal shape. Accordingly, the outside of the slot S is a large space and thus there is no problem in winding the coils. On the other hand, the inside of the slot S is a small space and thus the coils are limited in being wound.

Particularly, when the coil has a large diameter, a case in which the coils are not abundantly wound inside the slot S and are spatially wasted occurs.

FIG. 2 is a view illustrating the coil wound in the slot. Accordingly, FIG. 2 shows a state of winding, disposition, and a space factor of the coil.

As shown in FIG. 2, when a coil 33 having a diameter of 1.2 mm is wound around the tooth 32, the number of maximum turns of the coils disposed in the slot S cab is 31. Here, an arrow shows a winding direction of the coils 33.

In this case, insulators 34 can be disposed on the tooth 32. The insulators 34 insulate the tooth 32 and the coils 33.

Accordingly, it is difficult for the space factor of the coil wound in the conventional motor 2 to be improved in the above-described structure.

Meanwhile, the motor can be subjected to a dual winding process in which two coils are wound to realize two individual phases among a U phase, a V phase, and a W phase.

However, since in the dual winding process, second winding is performed after first winding, two winding processes should be performed. Accordingly, productivity decreases.

Further, an insulation problem between the coil which is wound first and the coil which is secondarily wound can occur.

DISCLOSURE

Technical Problem

An embodiment is directed to providing a stator unit of which a space factor of a coil is improved and a motor including the same.

An embodiment is directed to providing a stator and a motor in which two winding processes are simplified into one winding process while dual winding may be realized.

Further, the present invention is directed to providing a stator and a motor in which a wall structure in which a groove is formed in an insulator of the stator is used to solve an insulation problem and a coil disposed in the groove is cut to realize a dual winding structure.

Problems desired to be solved by the present invention are not limited to the above-described problems, and purposes and effects understood from solutions and embodiments which will be described below are also included.

Technical Solution

One aspect of the present invention provides a stator unit including: a stator core; a coil wound around the stator core; and an insulator disposed between the stator core and the coil, wherein the stator core includes a support part and a coil winding part disposed to protrude from both side surfaces of the support part, and the support part and the coil winding part are disposed in a cross shape.

Preferably, the coil may be wound around the coil winding part with respect to the coil winding part.

Further, a cross section of the coil may have a quadrangular shape.

In addition, a radius (STCR) from a virtual point (C) to a center of the coil winding part may be obtained by the following formula, $$STCR = \sqrt{((STOR^2 + STIR^2)/2)}$$

wherein STOR is a radius from the virtual point (C) to an outer side of the support part, and STIR is a radius from the virtual point (C) to an inner side of the support part.

In addition, a width (W1) of the coil winding part may be 0.55~0.65 of a width (W2) of the support part.

Another aspect of the present invention provides a motor including: a shaft; a rotor including a hole into which the shaft is inserted; and a stator disposed outside the rotor, wherein the stator is formed by disposing a plurality of stator units along a circumferential direction, the stator unit includes: a stator core; a coil wound around the stator core; and an insulator disposed between the stator core and the coil, the stator core includes: a support part disposed in a radial direction with respect to a center C; and a coil winding part disposed to protrude from both side surfaces of the support part in the circumferential direction, and the support part and the coil winding part are disposed in a cross shape.

Preferably, the coil may be wound around the coil winding part with respect to the coil winding part.

Further, a cross section of the coil may have a quadrangular shape.

In addition, a radius (STCR) from a virtual point (C) to a center of the coil winding part may be obtained by the following formula, $$STCR = \sqrt{((STOR^2 + STIR^2)/2)}$$

wherein STOR is a radius from the virtual point (C) to an outer side of the support part, and STIR is a radius from the virtual point (C) to an inner side of the support part.

In addition, a width (W1) of the coil winding part may be 0.55~0.65 of a width (W2) of the support part.

In addition, as the plurality of stator units may be disposed in the circumferential direction, a first slot may be formed at an outer side with respect to the coil winding part, and a second slot may be formed at an inner side with respect to the coil winding part.

Still another aspect of the present invention provides a stator including: a stator core; an insulator disposed on the stator core; and a coil wound around the insulator, wherein the insulator includes: a main body on which the coil is wound; an inner guide configured to protrude from an inner side of the main body; an outer guide configured to protrude from an outer side of the main body; a protruding part disposed between the inner guide and the outer guide and configured to protrude from the main body; and a groove formed in an upper portion of the protruding part.

Here, the groove may be open at an inner side surface and an outer side surface of the protruding part.

Further, the main body may include a first main body disposed between the protruding part and the inner guide and a second main body disposed between the protruding part and the outer guide, and the coil may be wound around the first main body and then wound around the second main body after passing through the groove.

In addition, as one area of the coil is cut, the coil may be divided into a first coil disposed on the first main body and a second coil disposed on the second main body, and two end portions may be formed in each of the first coil and the second coil.

In addition, each of the first coil and the second coil may include a start line and an end line.

One of the end portions of the coil formed as the one area of the coil adjacent to the groove is cut may become the end line of the first coil and the other may become the start line of the second coil.

Meanwhile, one side of the groove disposed in the inner side surface may be disposed adjacent to a side surface of the protruding part.

In this case, the groove may be disposed to be inclined a predetermined angle (θ) based on the inner side surface.

Further, a protruding height (H1) of the protruding part may be greater than a protruding height (H2) of the inner guide and smaller than a protruding height (H3) of the outer guide based on an upper surface of the main body.

Yet another aspect of the present invention provides a motor including: a shaft; a rotor disposed outside the shaft; a stator disposed outside the rotor; and a housing configured to accommodate the rotor and the stator, wherein the stator includes: a stator core; an insulator disposed on the stator core; and a coil wound around the insulator, the insulator includes: a main body on which the coil is wound; an inner guide configured to protrude from an inner side of the main body; an outer guide configured to protrude from an outer side of the main body; a protruding part configured to protrude from the main body; and a groove formed in an upper portion of the protruding part, and the groove is formed from an inner side surface of the protruding part to an outer side surface of the protruding part.

Here, the main body may include a first main body disposed inside the protruding part and a second main body disposed outside the protruding part based on the protruding part, and the coil may be wound around the first main body and then wound around the second main body after passing through the groove;

Further, as one area of the coil is cut, the coil may be divided into a first coil disposed on the first main body and a second coil disposed on the second main body, and two end portions may be formed in each of the first coil and the second coil.

In addition, each of the first coil and the second coil may include a start line and an end line, and one of the end portions of the coil formed when the one area of the coil adjacent to the groove is cut may become the end line of the first coil and the other may become the start line of the second coil.

In this case, a start line of the first coil and a start line of the second coil may be connected to a phase terminal or a neutral terminal when winding directions of the first coil and the second coil are the same.

Further, a start line of the first coil and an end line of the second coil may be connected to the phase terminal or the neutral terminal when winding directions of the first coil and the second coil are opposite to each other.

Meanwhile, the groove may be disposed to be inclined a predetermined angle (θ) based on the inner side surface.

Advantageous Effects

In an embodiment, a cross-shaped stator core can be used to improve a coil space factor.

Accordingly, when the motor realizes the same performance as a conventional motor, a size of the motor can be decreased.

Further, since an angular coil of which a cross section can be formed in a quadrangular shape is used instead of a circular coil which is conventionally used, the free space in a slot can be maximally used.

In an embodiment, a wall structure in which a groove is formed on an insulator of a stator can be used to solve an insulation problem and the coil disposed at the groove is cut to realize a dual winding structure.

Accordingly, productivity of the motor can be improved by simplifying a winding process.

DESCRIPTION OF DRAWINGS

FIGS. 15A-C are views illustrating a process in which coils are wound around the stator disposed in the motor according to the second embodiment, wherein FIG. 15A is view illustrating a coil wound around a first main body, FIG. 15B is view illustrating a coil wound around a second main body through a groove, and FIG. 15C is view illustrating a coil of which one area is cut.

MODES OF THE INVENTION

Figure 1:
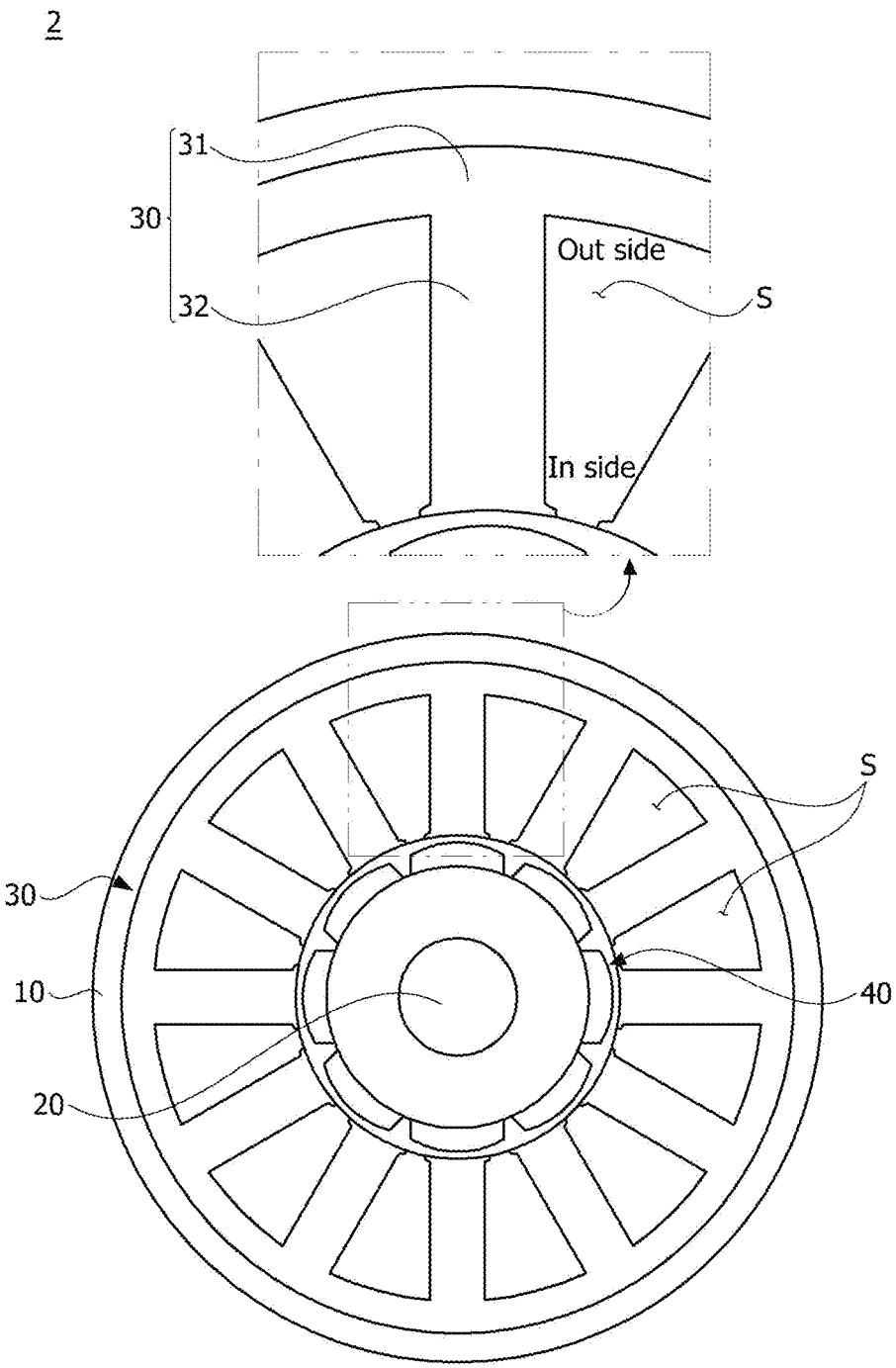
FIG. 1 is a transverse sectional view illustrating a conventional motor.

Since the present invention may be variously changed and have various embodiments, particular embodiments will be exemplified and described in the drawings. However, the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes any one or any combination among a plurality of associated listed items.

When predetermined components are mentioned to be "linked," "coupled," or "connected" to other components, the components may be directly linked or connected to other components, but it should be understood that additional components may be present therebetween. On the other hand, when the predetermined components are mentioned to be "directly linked," "directly coupled," or "directly connected" to other components, it should be understood that no additional components are present between the above-described components.

In the description of the embodiments, when one element is disclosed to be formed "on or under" another element, the term "on or under" includes both a case in which the two elements are in direct contact with each other and a case in which at least another element is disposed between the two elements (indirectly). Further, when the term "on or under" is expressed, a meaning of not only an upward direction but also a downward direction with respect to one element may be included.

Terms used in the present invention are used just to describe the particular embodiments, and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present invention have meanings the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the embodiments will be described in detail with reference to the accompanying drawing drawings, the same reference numerals are applied to the same or corresponding elements, and redundant description thereof will be omitted.

First Embodiment

Figure 3:
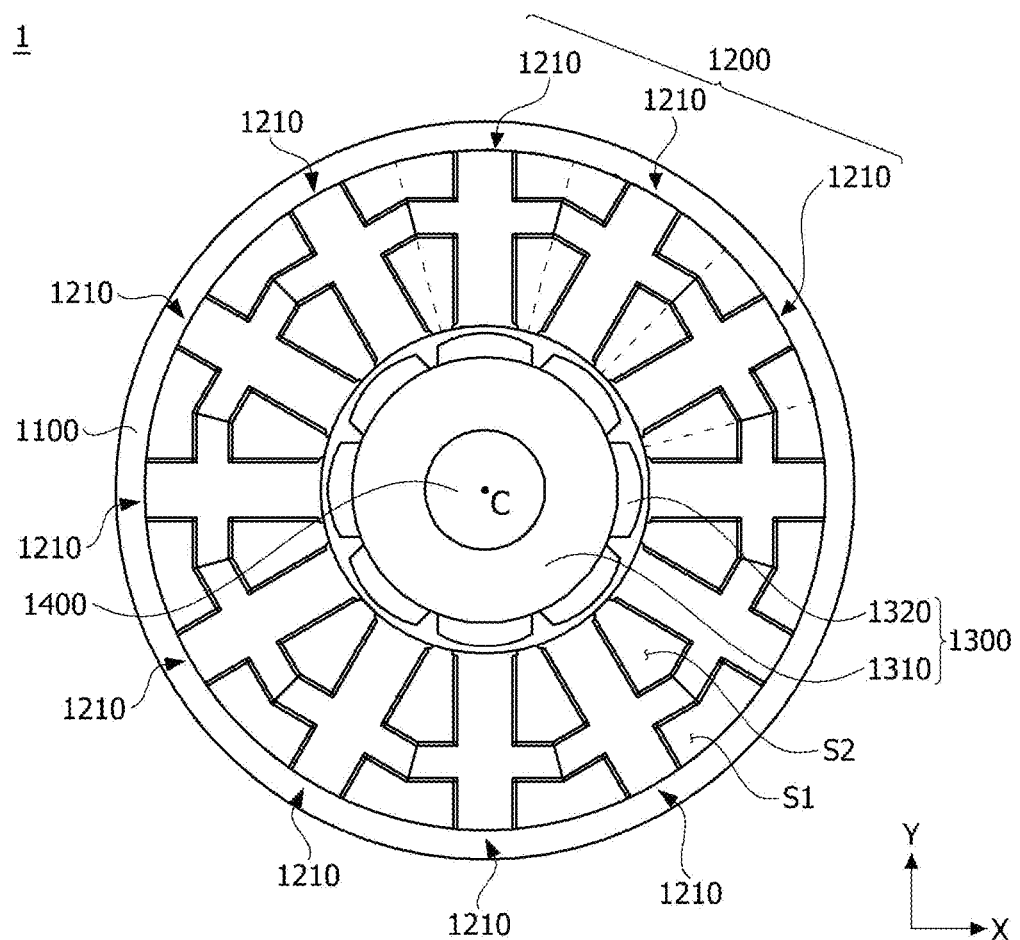
FIG. 3 is a transverse sectional view illustrating a motor according to a first embodiment.
Figure 4:
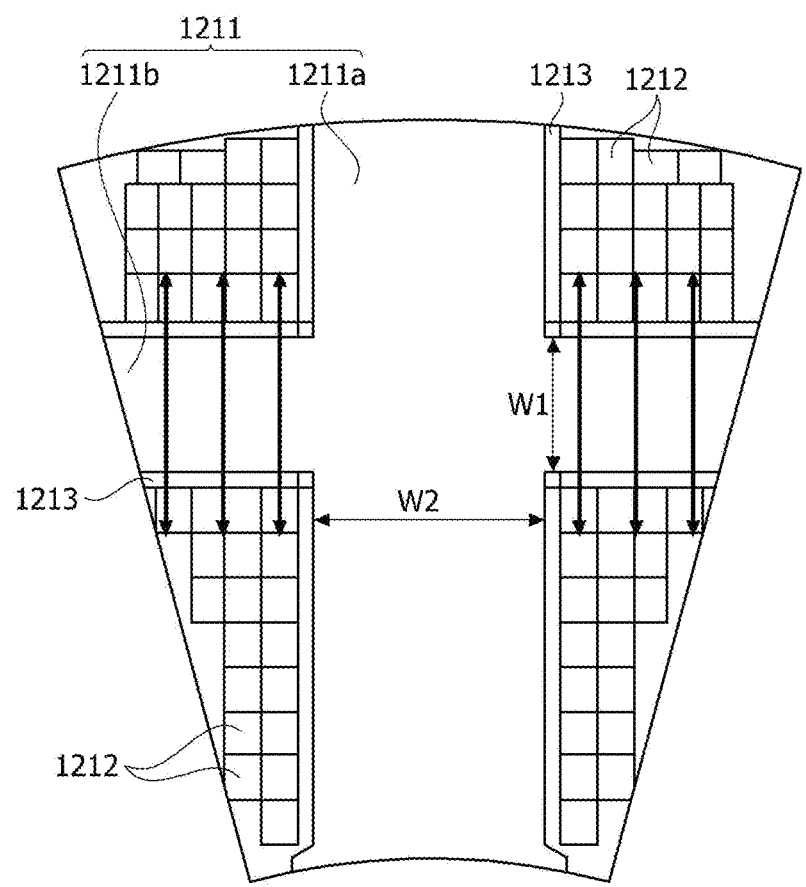
FIG. 4 is a view illustrating a stator unit of the motor according to the first embodiment.

FIG. 3 is a transverse sectional view illustrating a motor according to a first embodiment, and FIG. 4 is a view illustrating a stator unit of the motor according to the first embodiment.

Referring to FIG. 3, a motor 1 according to the first embodiment may include a housing 1100, a stator 1200, a rotor 1300, and a shaft 1400. Here, the rotor 1300 may include a rotor core 1310 and a plurality of magnets 1320 disposed on the rotor core 1310.

A cylindrical housing 1100 having an opening formed in an upper portion thereof and a bracket (not shown) configured to cover the opening may form an exterior of the motor 1. Here, the bracket may be referred to as a cover.

Accordingly, an accommodation space may be formed in the motor 1 by coupling of the housing 1100 and the bracket. Further, the stator 1200, the rotor 1300, the shaft 1400, and the like may be disposed in the accommodation space.

The housing 1100 may be formed in a cylindrical shape and disposed so that the stator 1200 may be supported by an inner circumferential surface thereof.

The stator 1200 may be supported by the inner circumferential surface of the housing 1100. Further, the stator 1200 is disposed at the outside of the rotor 1300. That is, the rotor 1300 may be disposed in the stator 1200.

Referring to FIG. 3, the stator 1200 may be formed by a plurality of stator units 1210.

The plurality of stator units 1210 may be disposed in the housing 1100 along a circumferential direction with respect to a center C of the motor 1.

Referring to FIG. 4, each of the stator units 1210 may include a stator core 1211, coils 1212, and insulators 1213. The coils 1212 are wound around the stator core 1211, and as shown in FIG. 4, the insulators 1213 may be disposed between the stator core 1211 and the coils 1212 for insulation.

Here, the stator core 1211 may be formed by a plurality of thin plates which are stacked on each other.

As shown in FIG. 4, the stator core 1211 may include a support part 1211*a* and a coil winding part 1211*b*. Here, the support part 1211*a* and the coil winding part 1211*b* may be integrally formed.

The support part 1211*a* may be disposed in a radial direction with respect to the center C. That is, the support part 1211*a* having a predetermined cross sectional area may be disposed toward the center C. Further, a transverse section of the support part 1211*a* may be formed in a quadrangular shape. Here, the radial direction may refer to a direction in which a radius extends.

In this case, as shown in FIG. 4, the support part 1211*a* may be formed to have a predetermined width W2 based on a circumferential direction. Further, the support part 1211*a* of one stator unit 1210 may be disposed to be spaced apart from the support part 1211*a* of another stator unit 1210.

The coil winding part 1211*b* may be disposed to protrude from both side surfaces of the support part 1211*a*. Preferably, the coil winding part 1211*b* may be formed to protrude in a circumferential direction from a radial direction center of the support part 1211*a*.

In this case, the coil winding part 1211*b* may be formed to have a predetermined width W1 based on the radial direction.

Accordingly, the support part 1211*a* and the coil winding part 1211*b* may be formed in a planar cross shape.

Accordingly, as shown in FIG. 3, since the plurality of stator units 1210 are disposed along the circumferential direction, the stator 1200 may include a first slot S1 and a second slot S2 which are spaces in which the coils 1212 are wound and disposed.

The first slot S1 may be disposed at an outer side with respect to the coil winding part 1211*b*.

The second slot S2 may be disposed at an inner side with respect to the coil winding part 1211*b*.

Here, with respect to the center C, the inner side refers to a direction that is disposed toward the center C, and the outer side refers to a direction opposite the inner side Meanwhile, the coils 1212 may be wound around the coil winding part 1211*b*. In this case, the insulators 1213 may be disposed on the stator core 1211. The insulators 1213 insulate the coil winding part 1211*b* and the coils 1212.

Currents may be applied to the coils 1212. Accordingly, an electrical interaction between the coils 1212 and the magnets 1320 of the rotor 1300 occurs, and thus the rotor 1300 may rotate. When the rotor 1300 rotates, the shaft 1400 also rotates.

The coils 1212 may be wound around the coil winding part 1211*b*. In this case, the coils 1212 may be wound in the radial direction with respect to the coil winding part 1211*b*. For example, as shown in FIG. 4, the coil 1212 may be wound around the coil winding part 1211*b*, one area of the coil 1212 may be disposed in the first slot S1 and the other area of the coil 1212 may be disposed in the second slot S2.

A cross section of the coil 1212 may be formed in a quadrangular shape. That is, a deflection coil may be used as the coil 1212.

An example in which the cross section of the coil 1212 has a quadrangular shape is described, but the embodiment is not limited to the above, and a deflection coil having various shapes such as a triangular shape, a pentagonal shape, a hexagonal shape, and the like may be used to improve a space factor.

Hereinafter, a space factor of the coil 33 wound around the motor 2 and a space factor of the coil 1212 of the motor 1 will be described with reference to FIGS. 2 and 4.

Figure 2:
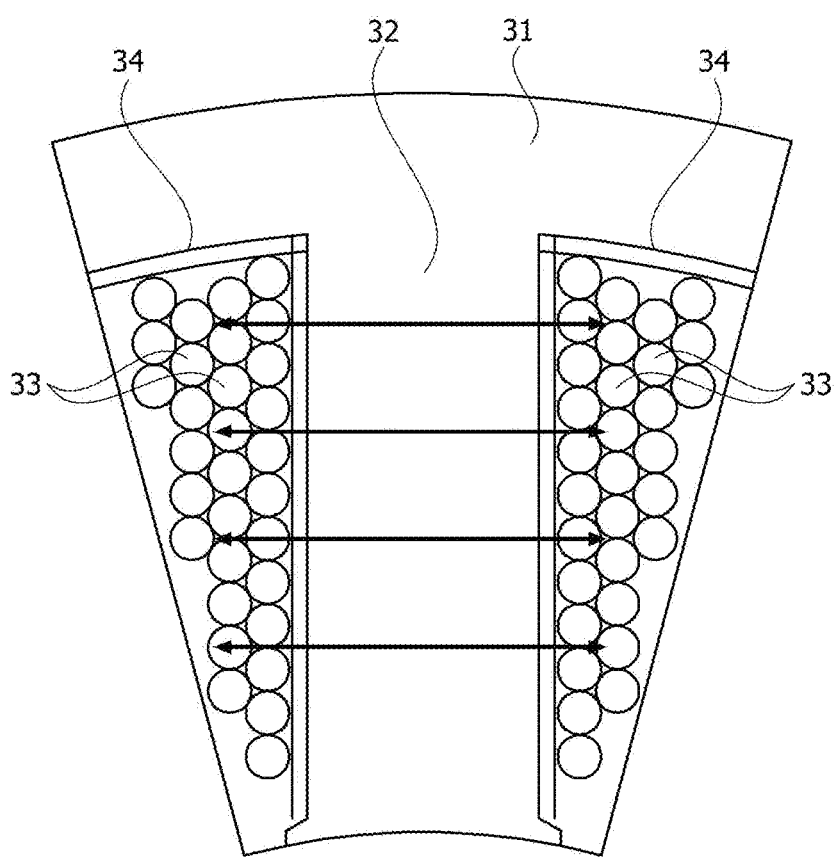
FIG. 2 is a view illustrating the coil wound in a slot of the conventional motor.

As shown in FIG. 2, 31 turns of the coil 33 having a diameter of 1.2 mm are wound in the slot S with respect to a tooth 32.

In the case of the motor 1, as shown in FIG. 4, 38 turns of the coil 1212 are wound by (19 turns at a left side and 19 turns at a right side) with respect to the coil winding part 1211*b*. In this case, the coil 1212 of the motor 1 is wound in a quadrangular coil shape having a cross sectional area the same as that of the coil 33 having a diameter of 1.2 mm.

Accordingly, 7 turns of the coil 1212 of the motor 1 may be further wound (roughly 20%) in comparison with the coil 33 of the motor 2.

That is, the space factor of the coil wound around the stator unit 1210 of the motor 1 increases roughly 20% in comparison with the space factor of the coil of the motor 2. However, in the motor 1, two winding processes in which 19 turns of the coil are wound at each of the left side and the right side are performed.

Accordingly, the motor 1 has an advantage that motor torque may be increased by 20% in comparison with the motor 2. Accordingly, the motor 1 may obtain the same output while reducing a size by 20% in comparison with the motor 2.

Meanwhile, the width W1 of the coil winding part 1211*b* of the stator core 1211 and the width W2 of the support part 1211*a* of the stator core 1211 have a major function in constituting a magnetic circuit.

For example, as the dimensions of the widths W1 and W2 decrease, the coil space factor increases, which is advantageous for the motor size. However, since a magnetic saturation phenomenon occurs in the stator core 1211, loss may increase.

Further, as the dimensions of the widths W1 and W2 increase, the coil space factor decreases and thus a motor size increases, but since the magnetic saturation phenomenon decreases, the loss may decrease.

Accordingly, in the design aspect of the motor 1, the dimensions of the widths W1 and W2 which are two design parameters should be appropriately determined.

Accordingly, in order to obtain a maximum effect according to the coil space factor, the width W1 of the coil winding part 1211*b* may be 0.55~0.65 of the width W2 of the support part 1211*a*.

However, the above condition is effective in a motor with concentrated windings.

Accordingly, the motor 1 may be provided with twelve stator units 1210 and eight magnets 1320. Further, the motor 1 may be provided with nine stator units 1210 and six magnets 1320. Alternatively, the motor 1 may be provided with twelve stator units 1210 and ten magnets 1320.

The rotor 1300 is disposed in the stator 1200. The shaft 1400 may be coupled to a center portion of the rotor 1300.

The rotor 1300 may include the rotor core 1310 and the magnets 1320 coupled to the rotor core 1310. The rotor 1300 may be classified into the following shapes according to a coupling method between the rotor core 1310 and the magnets 1320.

As shown in FIG. 3, the rotor 1300 may be implemented as a type in which the magnets 1320 are coupled to an outer circumferential surface of the rotor core 1310. In the SPM type rotor 1300, a separate can member (not shown) may be coupled to the rotor core 1310 to inhibit separation of the magnet 1320 and increase a coupling force. Further, the magnet 1320 and the rotor core 1310 may be integrally formed by double injection.

Meanwhile, the rotor 1300 may be implemented as a type in which the magnets 1320 are coupled to the inside of the rotor core 1310. In the IPM type rotor 1300, a pocket in which the magnets 1320 are inserted into the rotor core 1310 may be provided.

The rotor core 1310 may be formed by a plurality of thin plates which are stacked on each other. Of course, the rotor core 1310 may be manufactured in a single core form including one cylinder.

Further, the rotor core 1310 may be formed in a form in which a plurality of pucks (unit cores) forming a skew angle are stacked.

The shaft 1400 may be coupled to the rotor 1300. When an electromagnetic interaction occurs between the rotor 1300 and the stator 1200 due to current supply, the rotor 1300 rotates and thus the shaft 1400 rotates. In this case, the shaft 1400 may be supported by bearings (not shown) disposed at an outer circumferential surface of the shaft 1400.

Meanwhile, in order to maximize the coil space factor, a position of the coil winding part 1211*b* is important.

A disposing position of the coil winding part 1211*b* disposed on a side surface of the support part 1211*a* will be described with reference to FIG. 5.

Figure 5:
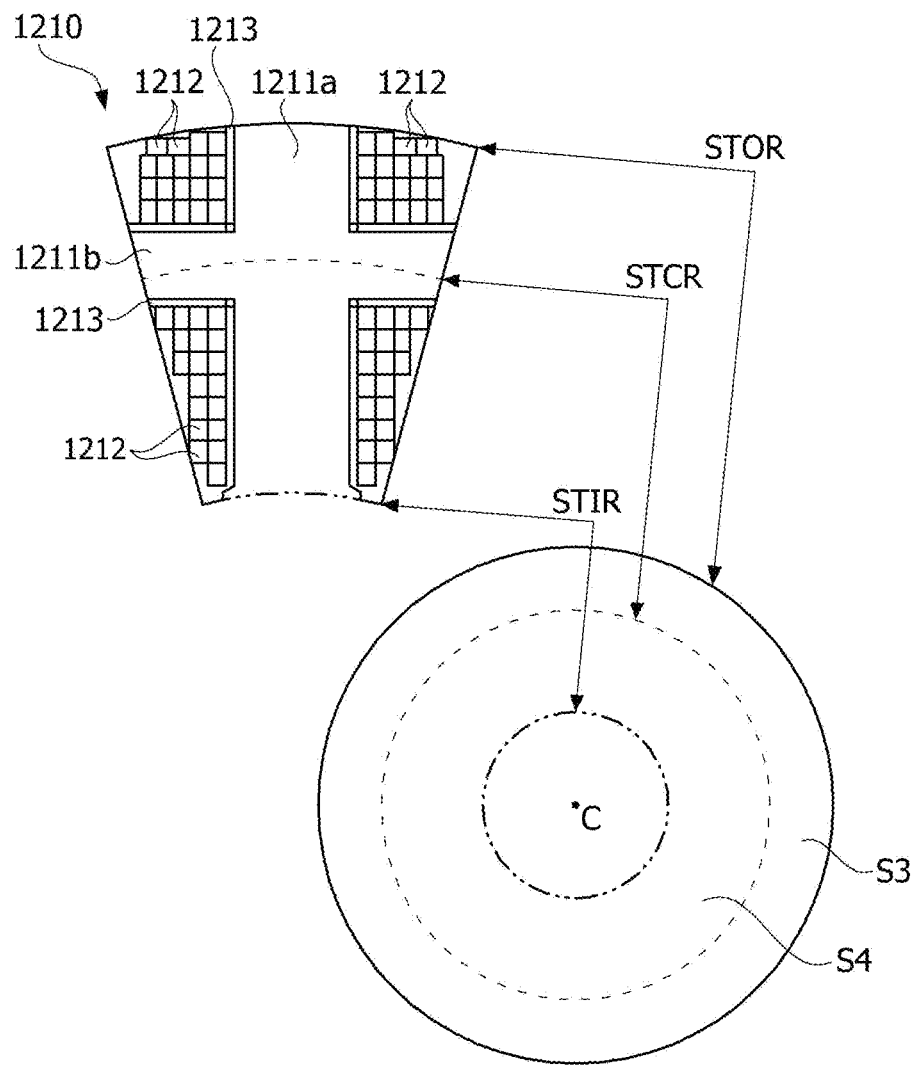
FIG. 5 is a view illustrating a position of a coil winding part of the stator unit disposed in the motor according to the first embodiment.

Here, FIG. 5 is a view illustrating the position of the coil winding part of the stator unit according to the embodiment, and is a view which simplifies the stator unit 1210 to find a condition for maximizing the coil space factor.

In this case, the stator unit 1210 has three parameters.

As shown in FIG. 5, the stator unit 1210 has parameters which are stator center radius (STCR), stator outer radius (STOR), and stator inner radius (STIR). That is, the STCR shows a radius from a virtual point C to a center of the coil winding part, the STOR shows a radius from the virtual point C to the outer side of the support part, and the STIR shows a radius from the virtual point C to the inner side of the support part. Here, the virtual point C may be the center C of the motor 1 or a center C of the shaft 1400.

Accordingly, areas S3 and S4 respectively shown as circles outside and inside the STCR will be calculated as follows:

S3 (the area disposed outside the $STCR$)=$STOR^2 \times \pi - STCR^2 \times \pi$ S4 (the area disposed outside the $STIR$)=$STCR^2 \times \pi - STIR^2 \times \pi$ Accordingly, in order to maximize the coil space factor, a formula in which S3 is equal to S4 should be satisfied, and may be shown as follows when simplified ($\pi$ is omitted).

$STOR^2 + STIR^2 = 2STCR^2$

Accordingly, the STCR which is a radius from the virtual point C to the center of the coil winding part may be obtained by the following formula.

$STCR = \sqrt{((STOR^2 + STIR^2)/2)}$

Further, the STCR obtained by the formula shows a position of the coil winding part 1211*b* for maximizing the coil space factor. In this case, the STCR may refer to a radius with respect to the center C.

Figure 6A:
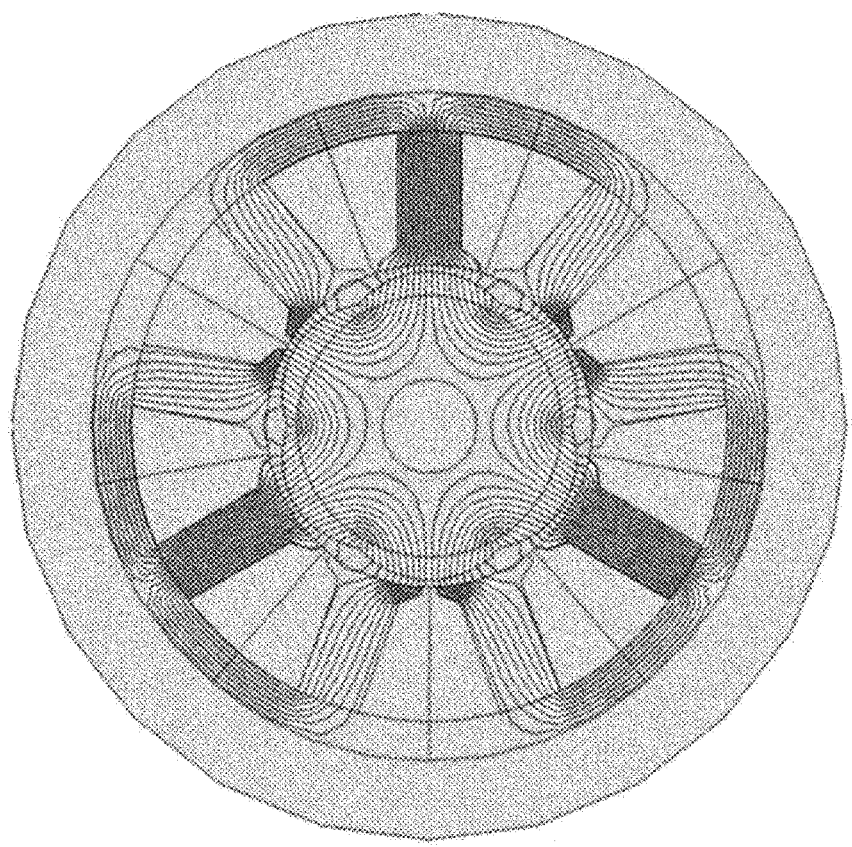
FIG. 6A is a view illustrating a magnetic path of the conventional motor.
Figure 6B:
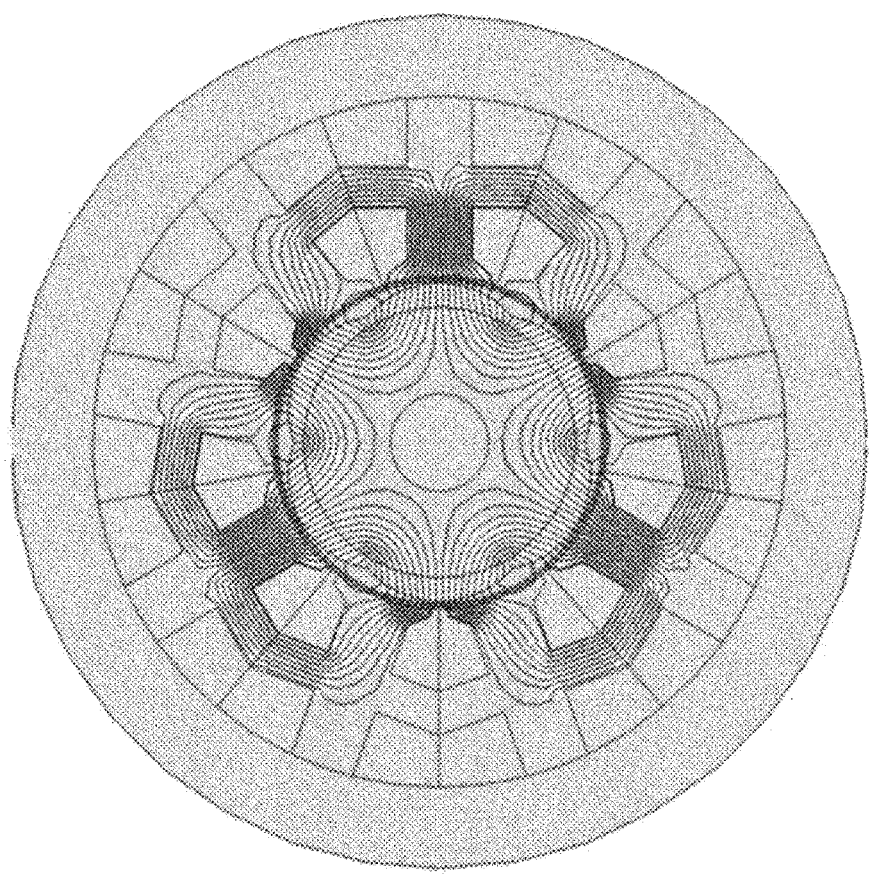
FIG. 6B is a view illustrating a magnetic path of the motor according to the first embodiment.

FIGS. 6A and 6B are views illustrating a magnetic path of the conventional motor and a magnetic path of the motor according to the first embodiment, wherein FIG. 6A is a view illustrating a magnetic path of the motor 2, and FIG. 6B is a view illustrating a magnetic path of the motor 1 according to the first embodiment.

As shown in FIGS. 6A and 6B, the motor 1 is not inferior in performance to the conventional motor 2 in consideration of the formed magnetic path.

Figure 7:
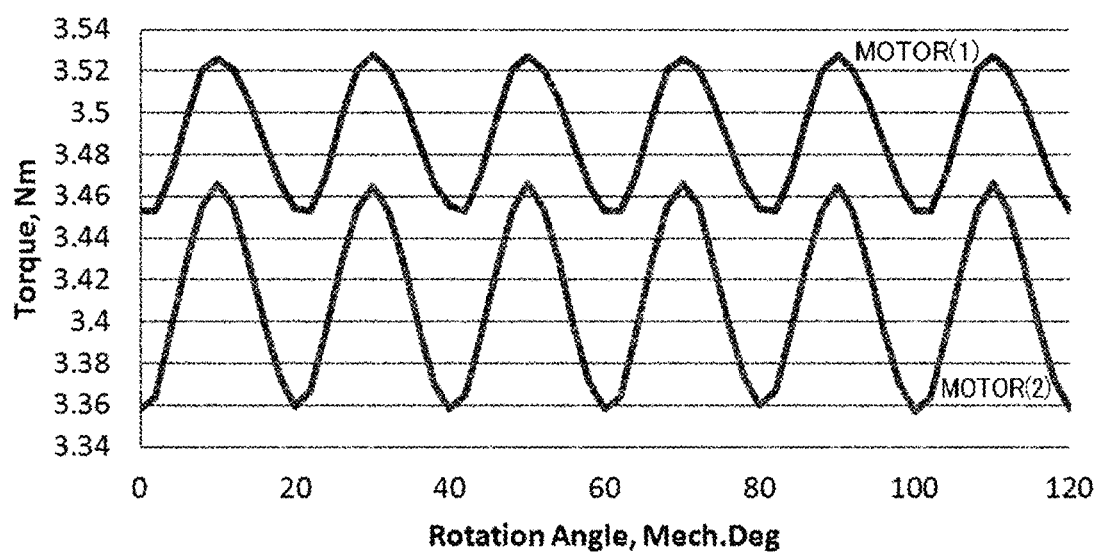
FIG. 7 is a view in which the performance of the conventional motor and the performance of the motor according to the first embodiment are compared.

FIG. 7 is a view in which the performance of the conventional motor and the performance of the motor according to the first embodiment are compared. In this case, under conditions of the same number of turns (24 turns), the same current (115 A), the same stack (30 mm), the conventional motor and the motor according to the first embodiment are compared based on a motor having six poles and nine slots. In this case, in the case of the motor 1, nine stator units 1210 may be disposed.

Here, the stack refers to a thickness in a longitudinal direction, which is an axial direction, of the shaft 1400 of the motor 1. For example, referring to FIG. 3, when a transverse section of the motor 1 is shown as an x-y axis, the stack refers to a thickness of the stator 1200 in a direction vertical to the transverse section of the motor 1.

Referring to FIG. 7, a torque value of the motor 1 rises to 3.49 Nm, which is an increase of roughly 2.3% in comparison with 3.41 Nm of the conventional motor 2.

Here, in the case of the motor 1, as described above, the coil space factor may further increase by increasing the number of turns of the coil 1212.

Accordingly, the motor 1 may decrease a length of the stack in inverse proportion to the increased number of turns.

That is, the stack of the motor 1 may be determined by a stack of the conventional motor 2 (30 mm)×24 turns (the number of turns of the coil of the motor 2)/N turns (the number of turns of the motor 1).

For example, the motor 1 has a stack length decreased by roughly 1.2 mm even when the number of winding turns of the coil 1212 of the motor 1 increases one turn. Accordingly, the stack of the motor 1 may be 28.8 mm.

Accordingly, the size of the motor 1 may be further decreased by increasing the winding number of the coil 1212 even when having the same performance as the conventional motor 2.

Meanwhile, while a two-stage process in which the insulator 34 is inserted into the stator 30 and the coils 33 are wound around the stator 30 is performed in the conventional motor 2, in the motor 1, since only a process of inserting the stator unit 1210, on which the coils 1212 are wound, into the motor 1 is performed, a working process is simplified. Accordingly, productivity of the motor 1 may be improved.

Second Embodiment

Figure 8:
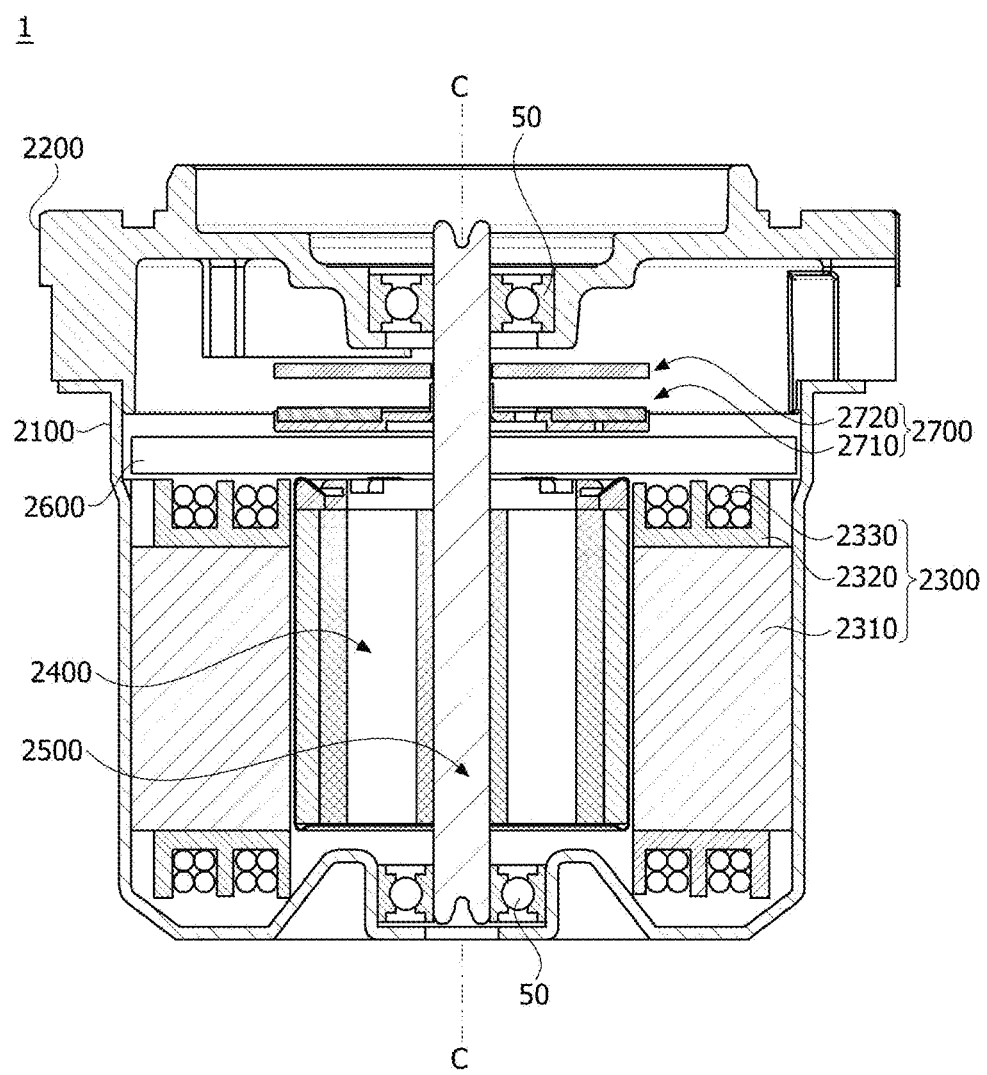
FIG. 8 is a view illustrating a motor according to a second embodiment.

FIG. 8 is a view illustrating a motor according to a second embodiment.

Referring to FIG. 8, a motor 1 according to the second embodiment includes a housing 2100 having an opening formed at one side thereof, a cover 2200 disposed on the housing 2100, a stator 2300 disposed in the housing 2100, a rotor 2400 disposed inside the stator 2300, a shaft 2500 configured to rotate with the rotor 2400, a bus bar 2600 disposed on the stator 2300, and a sensor part 2700 configured to sense rotation of the shaft 2500.

The motor 1 may be a motor used in an EPS. The electronic power steering system (EPS) assists a steering force using a driving force of the motor to ensure turning stability and provide a quick restoring force to allow a driver to safely drive.

The housing 2100 and the cover 2200 may form an exterior of the motor 1. Further, an accommodation space may be formed by coupling of the housing 2100 and the cover 2200. Accordingly, in the accommodation space, as shown in FIG. 8, the stator 2300, the rotor 2400, the shaft 2500, the bus bar 2600, the sensor part 2700, and the like may be disposed. In this case, the shaft 2500 is rotatably disposed in the accommodation space. Accordingly, the motor 1 may further include bearings 50 disposed at an upper portion and a lower portion of the shaft 2500.

The housing 2100 may be formed in a cylindrical shape. Further, the housing 2100 may accommodate the stator 2300, the rotor 2400, and the like therein. In this case, the shape or material of the housing 2100 may be variously changed. For example, the housing 2100 may be formed of a metal material that can withstand high temperatures.

The cover 2200 may be disposed on an open surface of the housing 2100 to cover the opening of the housing 2100, that is, may be disposed on the housing 2100.

The stator 2300 may be accommodated in the housing 2100. Further, the stator 2300 causes an electrical interaction with the rotor 2400. In this case, the stator 2300 may be disposed outside the rotor 2400 with respect to a radial direction.

Referring to FIG. 8, the stator 2300 may include a stator core 2310, an insulator 2320 disposed on the stator core 2310, and coils 2330 wound around the insulator 2320.

Figure 9:
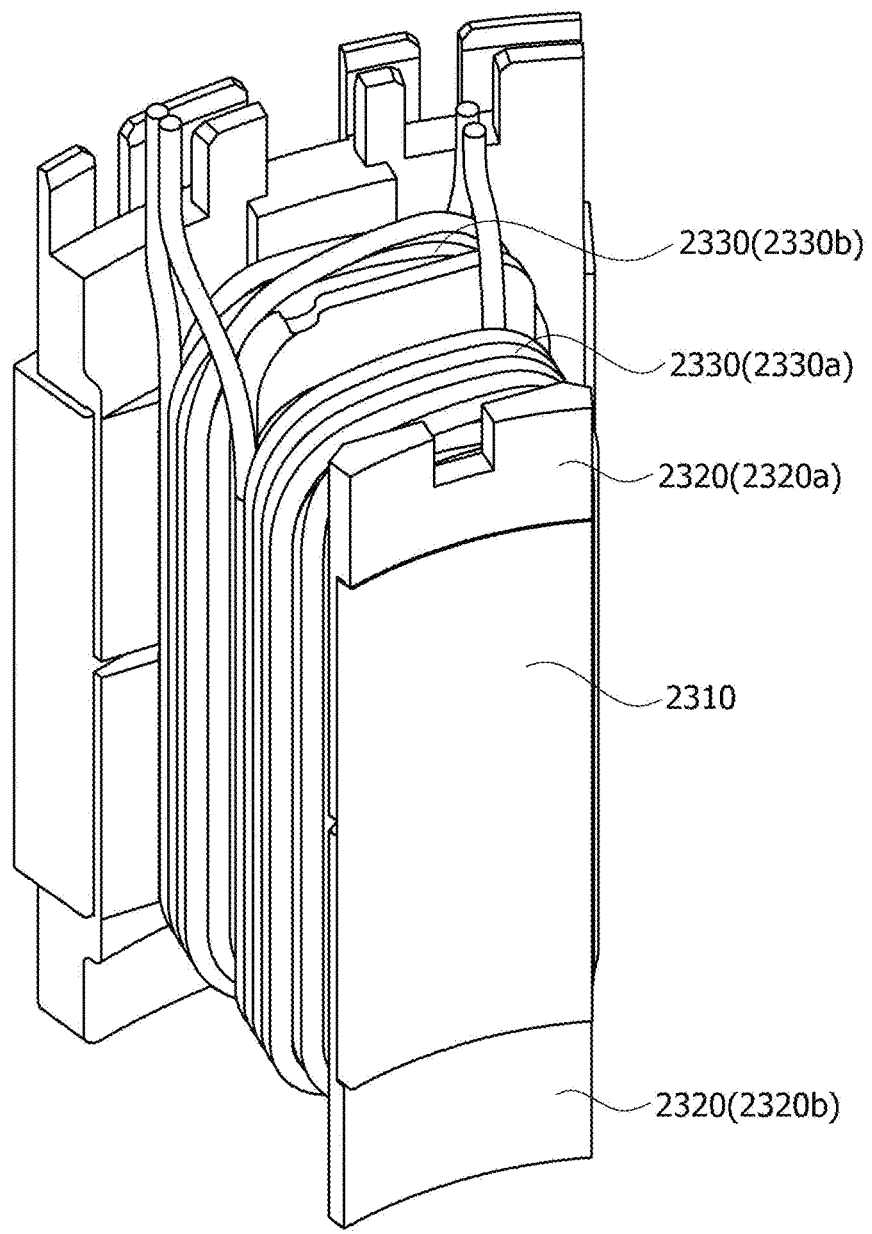
FIG. 9 is a view illustrating a stator unit of the motor according to the second embodiment.
Figure 10:
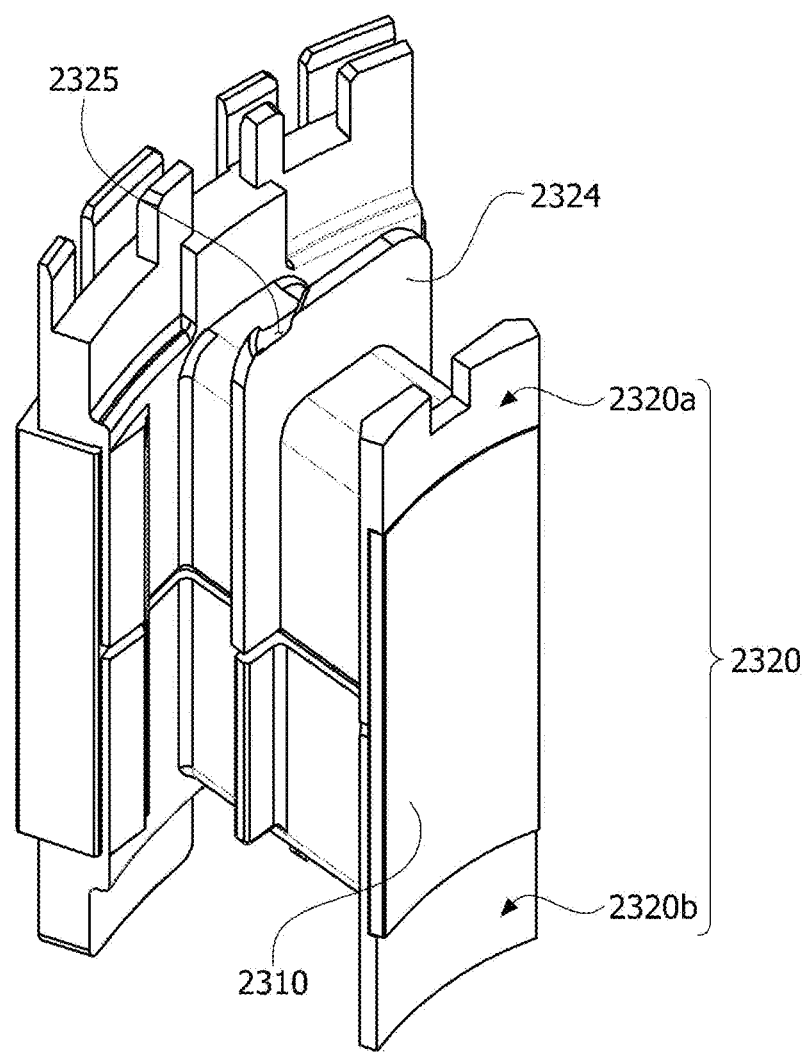
FIG. 10 is a perspective view illustrating a stator core and an insulator of a stator disposed in the motor according to the second embodiment.
Figure 11:
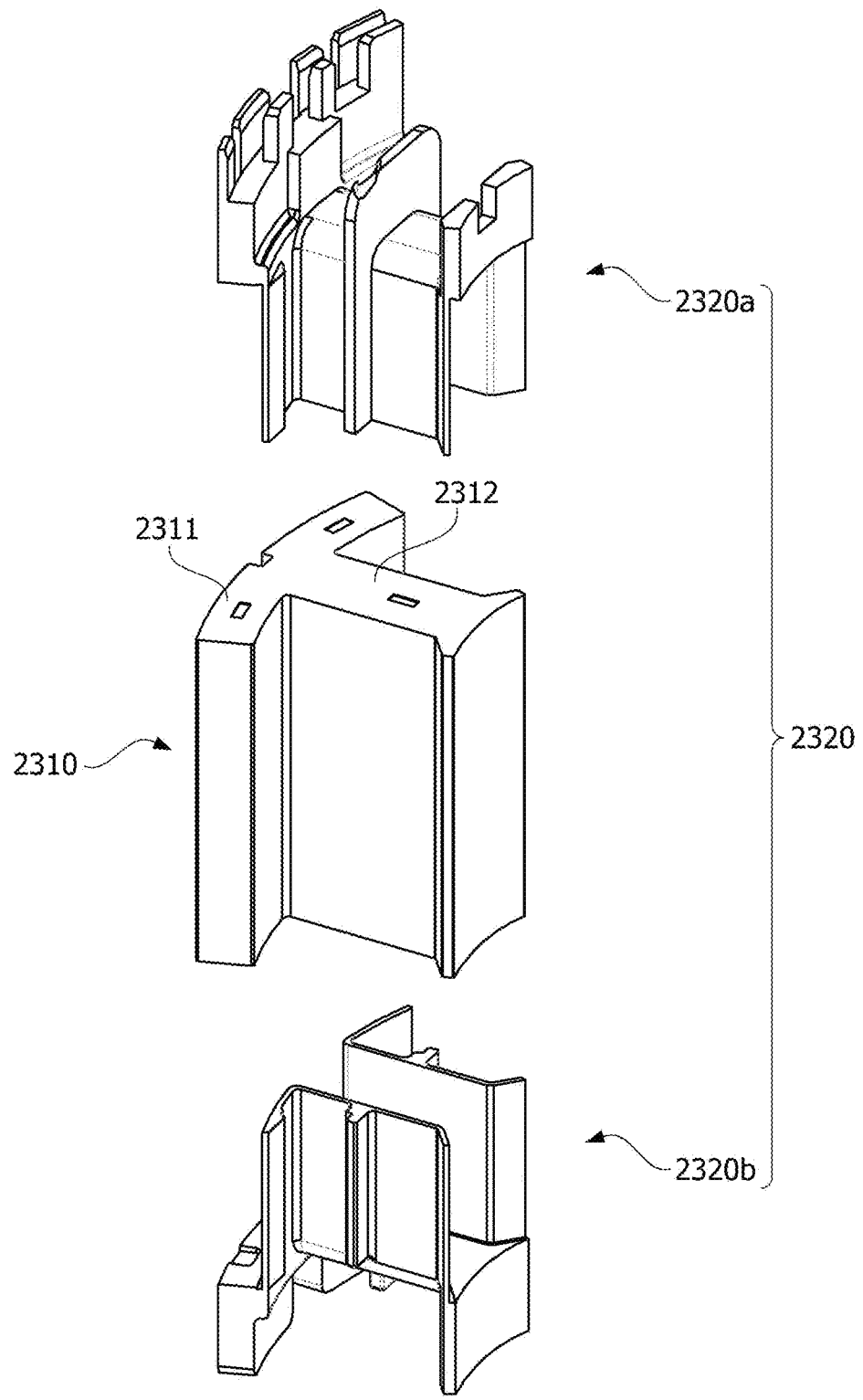
FIG. 11 is an exploded perspective view illustrating the stator core and the insulator of the stator disposed in the motor according to the second embodiment.

FIG. 9 is a view illustrating a stator unit of the motor according to the second embodiment, FIG. 10 is a perspective view illustrating the stator core and the insulator of the stator disposed in the motor according to the second embodiment, and FIG. 11 is an exploded perspective view illustrating the stator core and the insulator of the stator disposed in the motor according to the second embodiment.

The stator 2300 may be formed of a plurality of stator units.

In this case, by disposing a plurality of stator units 2300a shown in FIG. 9 along a circumferential direction, the stator 2300 of the motor 1 may be realized.

Referring to FIGS. 9 to 11, the stator unit 2300a may include the stator core 2310, the insulator 2320 disposed on the stator core 2310, and the coils 2330 wound around the insulator 2320.

The stator core 2310 may include an arc-shaped yoke 2311 and a tooth 2312. Further, the tooth 2312 may be formed to protrude from the yoke 2311 to wind the coil 2330. Here, although an example in which the yoke 2311 and the tooth 2312 are integrally formed is described, the present invention is not limited thereto.

The insulator 2320 is disposed on the stator core 2310. As shown in FIG. 9, the insulator 2320 may be disposed on the tooth 2312 of the stator core 2310 to insulate the stator core 2310 and the coils 2330. Here, the insulator 2320 may be formed of a resin material.

Referring to FIG. 11, the insulator 2320 may include an upper insulator 2320a disposed on the tooth 2312 and a lower insulator 2320b disposed under the tooth 2312.

Figure 12:
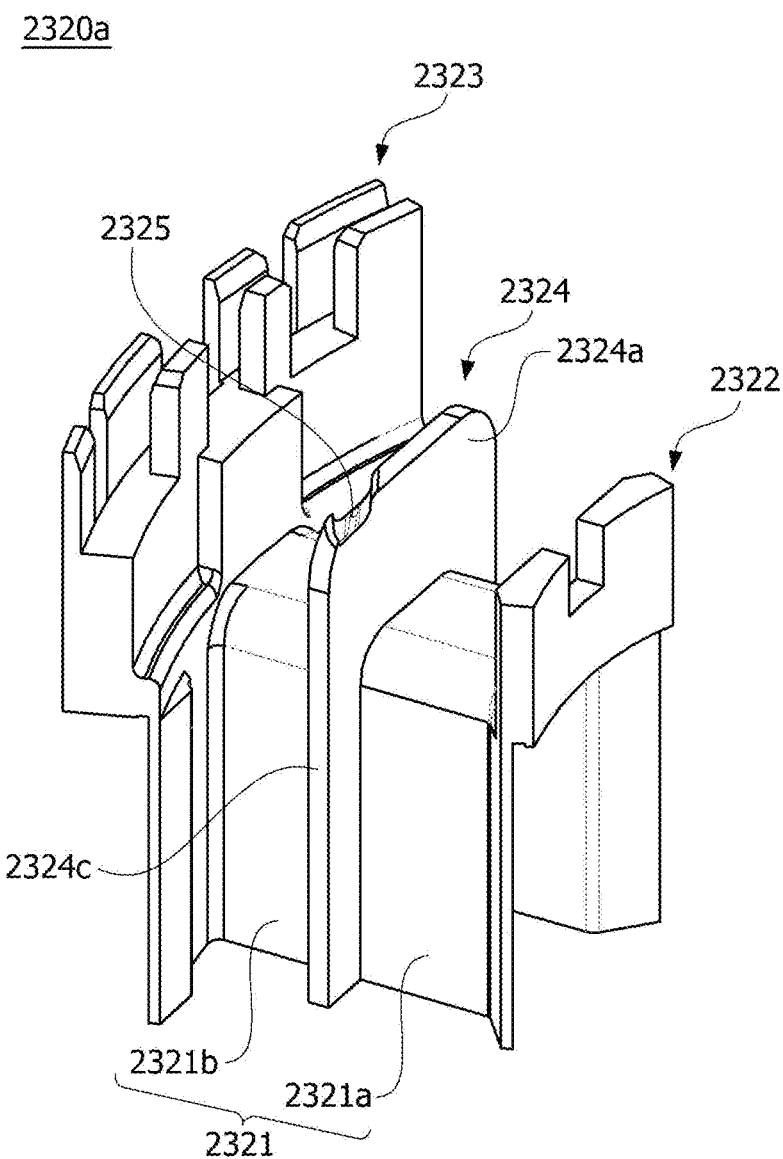
FIG. 12 is a perspective view illustrating the insulator of the motor according to the second embodiment.
Figure 13:
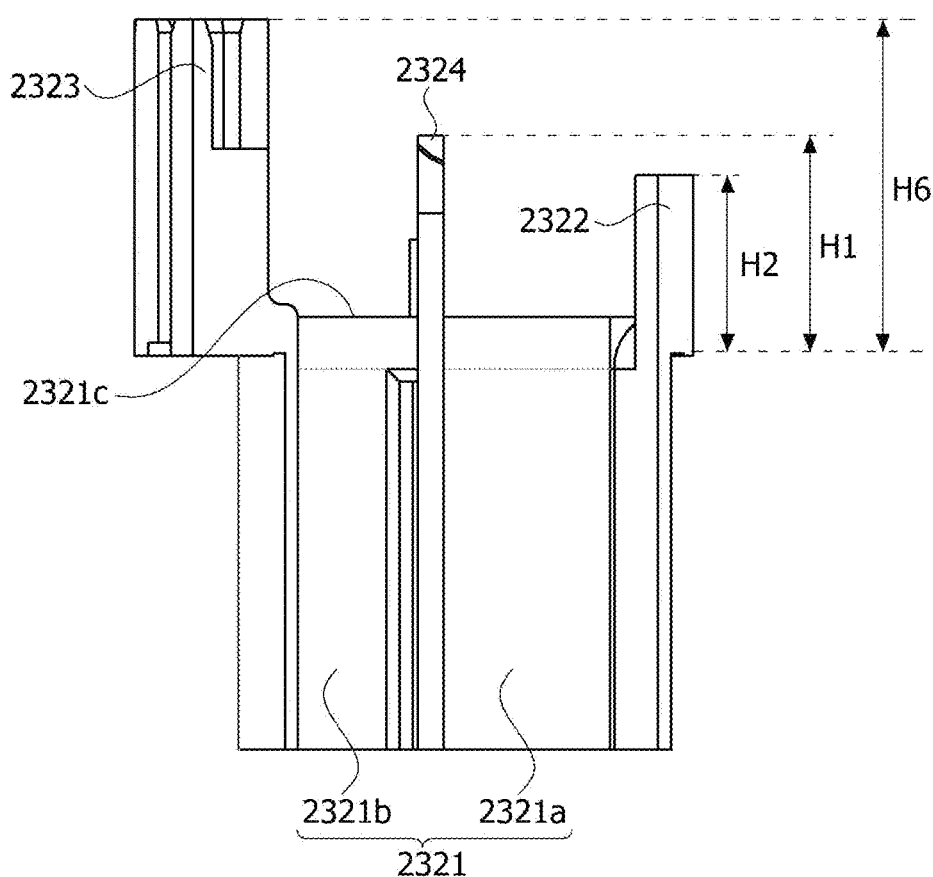
FIG. 13 is a side view illustrating the insulator of the motor according to the second embodiment.
Figure 14:
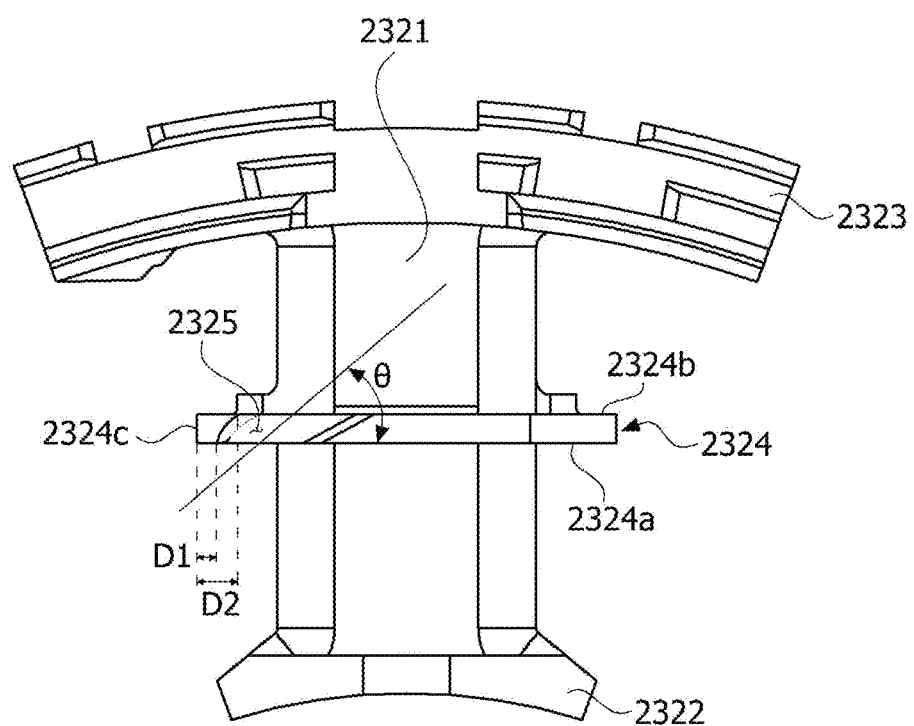
FIG. 14 is a plan view illustrating the insulator of the motor according to the second embodiment.

FIG. 12 is a perspective view illustrating the insulator of the motor according to the second embodiment, FIG. 13 is a side view illustrating the insulator of the motor according to the second embodiment, and FIG. 14 is a plan view illustrating the insulator of the motor according to the second embodiment.

Referring to FIGS. 12 to 14, the insulator 2320 may include a main body 2321, an inner guide 2322, an outer guide 2323, and a protruding part 2324. When the upper insulator 2320a is compared with the lower insulator 2320b, the upper insulator 2320a may further include a groove 2325 formed in the protruding part 2324.

The coils 2330 may be wound around the main body 2321.

The main body 2321 may be disposed on the stator core 2310 to insulate the stator core 2310 and the coils 2330.

The inner guide 2322 supports the coils 2330 wound around the main body 2321 to inhibit separation of the coils 2330 to the inside.

The inner guide 2322 may be disposed inside the main body 2321. Further, the inner guide 2322 may be formed to protrude from the inner side of the main body 2321 in an axial direction. Here, the inside refers to a direction toward the center C with respect to a radial direction, and the outside refers to a direction opposite the inside. Further, the axial direction is a longitudinal direction of the shaft 2500.

The outer guide 2323 supports the coils 2330 wound around the main body 2321 to inhibit separation of the coils 2330 to the outside.

The outer guide 2323 may be disposed outside the main body 2321. Further, the outer guide 2323 may be formed to protrude from the outer side of the main body 2321 in an axial direction.

The protruding part 2324 may be formed to protrude from the main body 2321. Further, the main body 2321 may be subdivided into a first main body 2321a and a second main body 2321b by the protruding part 2324. The first main body 2321a is disposed between the inner guide 2322 and the protruding part 2324, and the second main body 2321b is disposed between the outer guide 2323 and the protruding part 2324.

The protruding part 2324 may be disposed between the inner guide 2322 and the outer guide 2323. Further, as shown in FIG. 12, the protruding part 2324 may be formed in a plate shape in consideration of a space factor of the coil 2330. In this case, an edge of the protruding part 2324 may be subjected to rounding treatment. Here, although an example in which an embodiment of the protruding part 2324 is formed in the plate shape is described, the present invention is not limited thereto. For example, the protruding part 2324 may be formed to make an interior space to be disposed on the cross-shaped stator core 1211 of the motor 1 according to the first embodiment.

Accordingly, the protruding part 2324 insulates a first coil 2330a wound between the inner guide 2322 and the protruding part 2324 and a second coil 2330b wound between the outer guide 2323 and the protruding part 2324. For example, the first coil 2330a is wound around the first main body 2321a, and the second coil 2330b is wound around the second main body 2321b. Referring to FIG. 13, a protruding height H1 of the protruding part 2324 may be greater than a protruding height H2 of the inner guide 2322 and smaller than a protruding height H3 of the outer guide 2323 based on an upper surface 2321c of the main body 2321.

Referring to FIG. 12, the groove 2325 may be concavely formed in an upper portion of the protruding part 2324. In this case, the groove 2325 may be disposed to be spaced a predetermined interval from the upper surface 2321c of the main body 2321. In consideration of a case in which the coils 2330 are wound around the main body 2321, a height to the groove 2325 based on the upper surface 2321c should be formed greater than a height of the coil 2330 wound around the main body 2321. Accordingly, a risk of contact between the first coil 2330a and the second coil 2330b may be minimized.

As shown in FIG. 14, the groove 2325 may be extended from the inner side surface 2324a of the protruding part 2324 to the outer side surface 2324b of the protruding part 2324. That is, the groove 2325 may be open at the inner side surface 2324a of the protruding part 2324 and the outer side surface 2324b of the protruding part 2324.

In this case, the groove 2325 may be disposed to be inclined a predetermined angle θ based on the inner side surface 2324a. Further, one side of the groove 2325 disposed in the inner side surface 2324a may be disposed adjacent to a side surface 2324c of the protruding part 2324. Here, adjacency refers to disposition to be spaced a predetermined interval apart.

As shown in FIG. 14, a distance D1 to one side of the groove 2325 disposed in the inner side surface 2324a based on the side surface 2324c of the protruding part 2324 is smaller than a distance D2 to the other side of the groove 2325 based on the side surface 2324c of the protruding part 2324.

Further, one area of the coil 2330 may be disposed in the groove 2325. In this case, an edge of the groove 2325 which meets the upper surface of the protruding part 2324 may be rounded to protect the coils 2330.

The coils 2330 may be wound around the insulator 2320. Further, the coils 2330 may form a rotating magnetic field by power supply.

The coils 2330 may be subdivided into the first coil 2330a and the second coil 2330b according to disposing positions with respect to the protruding part 2324. The first coil 2330a is wound around an area of the main body 2321 between the inner guide 2322 and the protruding part 2324, that is, around the first main body 2321a. Further, the second coil 2330b is wound around an area of the main body 2321 between the outer guide 2323 and the protruding part 2324, that is, around the second main body 2321b.

Figure 15A:
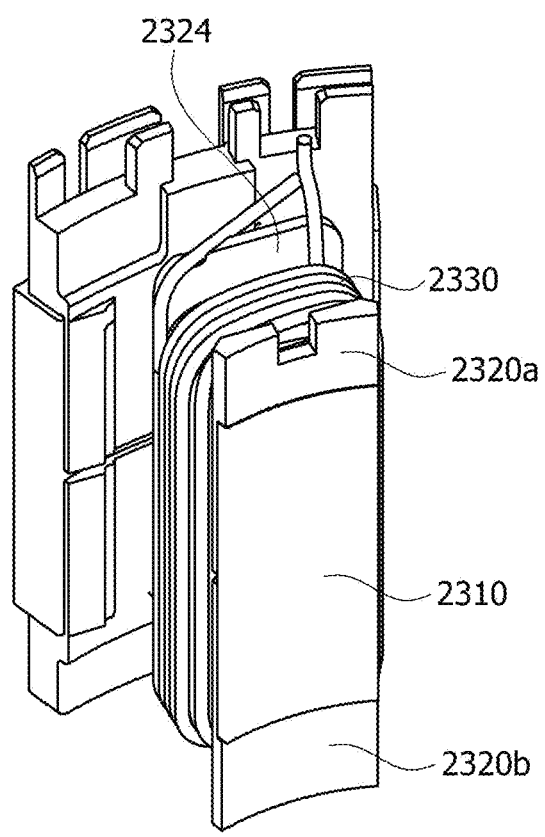
Figure 15B:
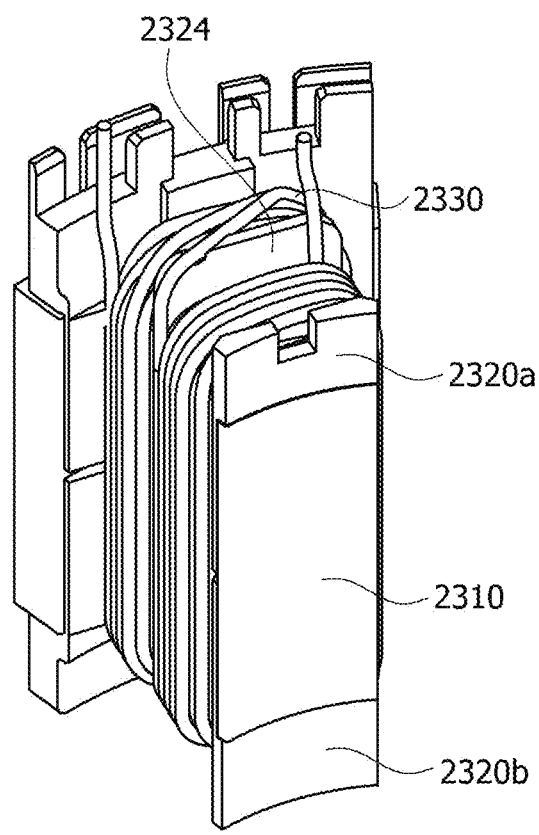
Figure 15C:
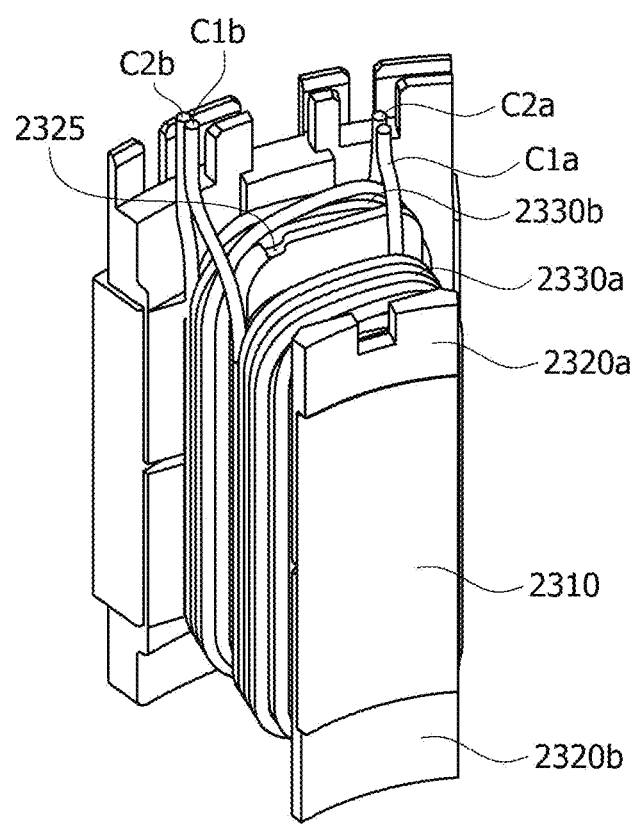

FIGS. 15A-15C are views illustrating a process in which the coils are wound around the stator disposed in the motor according to the second embodiment, wherein FIG. 15A is view illustrating the coil wound around the first main body, FIG. 15B is view illustrating the coil wound around the second main body through the groove, and FIG. 15C is view illustrating the coil of which one area is cut.

Referring to FIG. 15A, the coils 2330 may be wound around the first main body 2321a and then move to the second main body 2321b by passing through the groove 2325.

Referring to FIG. 15B, the coils 2330 which pass through the groove are wound around the second main body 2321b. Accordingly, the coil 2330 may include two end portions.

That is, two separate winding processes are conventionally performed to wind the coils 2330 around the first main body 2321a and the second main body 2321b, but as shown in FIG. 15B, in the motor 1, the coils 2330 are wound around the first main body 2321a and the second main body 2321b by a single winding process using the groove 2325.

Referring to FIG. 15C, one area of the coil 2330 is cut. In this case, the area of the coil 2330 which is cut may be an area adjacent to the groove 2325. Accordingly, since the coil 2330 is divided into the first coil 2330a wound around the first main body 2321a and the second coil 2330b wound around the second main body 2321b, a dual winding structure may be realized.

In this case, two end portions C1a and C1b of the first coil 2330a may be disposed to be upwardly exposed. Further, two end portions C2a and C2b of the second coil 2330b may be disposed to be upwardly exposed. In addition, the end portions C1a, C1b, C2a, and C2b of the first coil 2330a and the second coil 2330b may be coupled to a terminal (not shown) of the bus bar 2600.

In this case, positions of the end portions C1a, C1b, C2a, and C2b of the first coil 2330a and the second coil 2330b are determined according to a starting position and a winding direction of the wound coil 2330.

For example, on the first main body 2321a, positions of the end portions C1a and C1b of the first coil 2330a are determined by a position at which the first coil 2330a starts to be wound and a winding direction of the first coil 2330a. Further, on the second main body, positions of the end portions C2a and C2b of the second coil 2330b are determined by a position at which the second coil 2330b starts to be wound and a winding direction of the second coil 2330b.

In this case, disposing the end portions C1a, C1b, C2a, and C2b adjacent to the protruding part 2324 is optimal for coupling to the terminal of the bus bar 2600, but the present invention is not limited thereto. For example, the positions of the end portions C1a, C1b, C2a, and C2b may be changed in consideration of a design structure of the bus bar 2600.

For example, when the first coil 2330a starts to be wound around the first main body 2321a at a location adjacent to the protruding part 2324, the number of winding layers of the first coil 2330a wound around the first main body 2321a may be an even number, and when the second coil 2330b is wound around the second main body 2321b after the first coil 2330a is wound around the first main body 2321a and passes through the groove 2325 of the protruding part 2324, winding should be started at the location adjacent to the protruding part 2324 like above. In this case, the number of winding layers of the second coil 2330b wound around the second main body 2321b may also be an even number. In this case, the end portions C1a, C1b, C2a, and C2b may be disposed adjacent to the protruding part 2324. Of course, other ways of winding in addition to the above way of winding may be used.

The rotor 2400 may be disposed inside the stator 2300, and the shaft 2500 may be coupled to a center portion of the rotor 2400. Here, the rotor 2400 may be rotatably disposed in the stator 2300.

The rotor 2400 may include a rotor core and magnets. The rotor core may be realized in a shape in which a plurality of plates having a form of a circular thin steel plate are stacked or in the form of one cylinder. A hole to which the shaft 2500 is coupled may be formed in a center of the rotor core. A protrusion configured to guide the magnets may protrude from an outer circumferential surface of the rotor core. The magnets may be attached to the outer circumferential surface of the rotor core. The plurality of magnets may be disposed along a circumference of the rotor core at predetermined intervals. Further, the rotor 2400 may be configured as a type in which the magnets are inserted into a pocket of the rotor core.

Accordingly, the rotor 2400 rotates due to an electrical interaction between the coils 2330 and the magnets, and when the rotor 2400 rotates, the shaft 2500 rotates to generate a driving force.

Meanwhile, the rotor 2400 may further include a can member disposed to surround the magnets. The can member fixes the magnets to inhibit separation of the magnets from the rotor core. Further, the can member may inhibit the exposure of the magnets to the outside.

The shaft 2500 may be rotatably disposed in the housing 2100 by the bearing 50.

The bus bar 2600 may be disposed on the stator 2300.

Further, the bus bar 2600 may be electrically connected to the coils 2330 of the stator 2300.

The bus bar 2600 may include a bus bar main body and a plurality of terminals disposed in the bus bar main body.

The bus bar main body may be a molded product formed through injection-molding.

The terminals may be electrically connected to the end portions C1a and C1b of the first coil 2330a or the end portions C2a and C2b of the second coil 2330b. Here, the plurality of terminals may include a neutral terminal and a phase terminal for a U phase, a V phase, and a W phase.

Here, each of the first coil 2330a and the second coil 2330b may include a start line and an end line. Here, the start lines may be portions at which windings of the coils 2330a and 2330b start, and the end lines may be portions at which windings of the coils 2330a and 2330b end.

Referring to FIG. 15C, one of end portions of the coil 2330 formed as the one area of the coil 2330 adjacent to the groove 2325 is cut may be the end line of the first coil 2330a, and the other may be the start line of the second coil 2330b.

As shown in FIG. 15C, the first coil 2330a may include a start line C1a and an end line C1b thereof, and the second coil 2330b may include a start line C2a and an end line C2b thereof. However, the present invention is not limited thereto, and the start lines and the end lines may be determined according to a winding direction of the first coil 2330a wound around the first main body 2321a and a winding direction of the second coil 2330b wound around the second main body 2321b.

As shown in FIG. 15C, when the first coil 2330a is wound around the first main body 2321a in a clockwise direction, when viewed from a center of the stator 2300, the end portion C1a at a right side with respect to the tooth 2312 may be the start line of the first coil 2330a, and the end portion C1b at a left side with respect to the tooth 2312 may be the end line of the first coil 2330a.

Further, when the second coil 2330b is wound around the second main body 2321b in a clockwise direction, when viewed from the center of the stator 2300, the end portion C2a at a right side with respect to the tooth 2312 may be the start line of the second coil 2330b, and the end portion C2b at a left side with respect to the tooth 2312 may be the end line of the second coil 2330b.

The end portions C1a and C1b of the first coil 2330a or the end portions C2a and C2b of the second coil 2330b are connected to the phase terminal and the neutral terminal, respectively.

When all the winding directions are the same (all the winding directions are a clockwise direction or a counter-clockwise direction), both the start line C1a of the end portions of the first coil 2330a and the start line C2a of the end portions of the second coil 2330b should be connected to the phase terminal or the neutral terminal.

Further, when the winding directions are opposite to each other (in the case in which the first coil is wound in the clockwise direction and the second coil is wound in the counterclockwise direction, or in the case in which the first coil is wound in the counterclockwise direction and the second coil is wound in the clockwise direction), both the start line C1a of the end portions of the first coil 2330a and the end line C2b of the end portions of the second coil 2330b should be connected to the phase terminal or the neutral terminal.

Since the sensor part 2700 may grasp a present position of the rotor 2400 by sensing a magnetic force of a sensing magnet installed in a rotatable interlinked manner with the rotor 2400, the rotation of the shaft 2500 may be sensed.

The sensor part 2700 may include a sensing magnet assembly 2710 and a printed circuit board (PCB, 2720).

The sensing magnet assembly 2710 is coupled to the shaft 2500 to interwork with the rotor 2400 and thus the position of the rotor 2400 is detected. In this case, the sensing magnet assembly 2710 may include the sensing magnet and a sensing plate. The sensing magnet and the sensing plate may be coaxially coupled to each other.

The sensing magnet may include a main magnet disposed adjacent to a hole forming an inner circumferential surface of the sensing magnet in a circumferential direction, and a sub-magnet formed on an edge of the sensing magnet. The main magnet may be arranged in the same manner as a drive magnet inserted into the rotor 2400 of the motor. The sub-magnet is subdivided more than the main magnet and formed of many poles. Accordingly, a rotating angle may be divided more finely to be measured, and driving of the motor may become smoother.

The sensing plate may be formed of a disk-shaped metal material. The sensing magnet may be coupled to an upper surface of the sensing plate. Further, the sensing plate may be coupled to the shaft 2500. Here, a hole through which the shaft 2500 passes may be formed in the sensing plate.

A sensor configured to sense the magnetic force of the sensing magnet of the sensing magnet assembly 2710 may be disposed on the printed circuit board 2720. In this case, the sensor may be provided as a Hall IC. Further, the sensor may generate sensing signals by sensing a change of the N-pole and the S-pole of the sensing magnet.

Although the above-described descriptions are described with reference to the embodiments of the present invention, it should be understood that those skilled in the art may be capable of variously modifying and changing the present invention within the spirit and the scope disclosed in the claims which will be described below. Further, differences related to modifications and changes should be understood to be included in the scope of the present invention defined in the appended claims.

REFERENCE NUMERALS 1, 2: motor, 1100, 2100: housing, 1200, 2300: stator, 1300, 2400: rotor, 1400, 2500: shaft, 2600: bus bar, 2700: sensor part

The invention claimed is:

1. A motor comprising:
a shaft;
a rotor including a hole into which the shaft is inserted; and
a stator disposed outside the rotor,
wherein the stator is formed by disposing a plurality of stator units along a circumferential direction,
the stator unit includes a stator core, a coil wound around the stator core, and an insulator disposed between the stator core and the coil,
the stator core includes a support part disposed in a radial direction with respect to a center of the shaft, and a coil winding part disposed to protrude from both side surfaces of the support part in the circumferential direction, and
the support part and the coil winding part are disposed in a cross shape,
wherein a radius (STCR) from a virtual point (C) to a center of the coil winding part is obtained by the following formula, $$STCR = \sqrt{((STOR^2 + STIR^2)/2)}$$

wherein STOR is a radius from the virtual point (C) to an outer side of the support part, and STIR is a radius from the virtual point (C) to an inner side of the support part.

2. The motor of claim 1, wherein the coil is wound around the coil winding part.

3. The motor of claim 1, wherein, as the plurality of stator units are disposed in the circumferential direction, a first slot is formed at an outer side with respect to the coil winding part and a second slot is formed at an inner side with respect to the coil winding part.

4. The motor of claim 1, wherein a width (W1) of the coil winding part is 0.55~0.65 of a width (W2) of the support part.

5. A stator comprising:
a stator core;
an insulator disposed on the stator core; and
a coil wound around the insulator,
wherein the insulator includes a main body on which the coil is wound, an inner guide configured to protrude from an inner side of the main body, an outer guide configured to protrude from an outer side of the main body, a protruding part disposed between the inner guide and the outer guide and configured to protrude from the main body, and a groove formed in an upper portion of the protruding part, and
wherein the groove is inclined with respect to an inner side surface of the protruding part.

6. The stator of claim 5, wherein the groove is open at an inner side surface and an outer side surface of the protruding part.

7. The stator of claim 6, wherein:
the main body includes a first main body disposed between the protruding part and the inner guide and a second main body disposed between the protruding part and the outer guide; and
the coil is wound around the first main body and then wound around the second main body after passing through the groove.

8. The stator of claim 7, wherein:
as one area of the coil is cut, the coil is divided into a first coil disposed on the first main body and a second coil disposed on the second main body; and
two end portions are formed in each of the first coil and the second coil.

9. The stator of claim 8, wherein:
each of the first coil and the second coil includes a start line and an end line; and
one of the end portions of the coil formed as the one area of the coil adjacent to the groove is cut becomes the end line of the first coil and the other becomes the start line of the second coil.

10. The stator of claim 5, wherein a protruding height (H1) of the protruding part is greater than a protruding height (H2) of the inner guide and smaller than a protruding height (H3) of the outer guide based on an upper surface of the main body.

11. A motor comprising:
a shaft;
a rotor disposed outside the shaft;
a stator disposed outside the rotor; and
a housing configured to accommodate the rotor and the stator,
wherein the stator includes a stator core, an insulator disposed on the stator core, and a coil wound around the insulator,
wherein the insulator includes a main body on which the coil is wound, an inner guide configured to protrude from an inner side of the main body, an outer guide configured to protrude from an outer side of the main body, a protruding part configured to protrude from the main body, and a groove formed in an upper portion of the protruding part,
wherein the groove is formed from an inner side surface of the protruding part to an outer side surface of the protruding part, and
wherein the groove is inclined with respect to the inner side surface of the protruding part.

12. The motor of claim 11, wherein:
the main body includes a first main body disposed inside the protruding part and a second main body disposed outside the protruding part based on the protruding part;
the coil is wound around the first main body and then wound around the second main body after passing through the groove;
as one area of the coil is cut, the coil is divided into a first coil disposed on the first main body and a second coil disposed on the second main body; and
two end portions are formed in each of the first coil and the second coil.

13. The motor of claim 12, wherein a start line of the first coil and a start line of the second coil are connected to a phase terminal or a neutral terminal when winding directions of the first coil and the second coil are the same.

14. The motor of claim 12, wherein a start line of the first coil and an end line of the second coil are connected to a phase terminal or a neutral terminal when winding directions of the first coil and the second coil are opposite to each other.

15. A motor comprising:
a shaft;
a rotor disposed outside the shaft;
a stator disposed outside the rotor; and
a housing configured to accommodate the rotor and the stator,
wherein the stator includes a stator core, an insulator disposed on the stator core, and a coil wound around the insulator,
wherein the insulator includes a main body on which the coil is wound, an inner guide configured to protrude from an inner side of the main body, an outer guide configured to protrude from an outer side of the main body, a protruding part configured to protrude from the main body, and a groove formed in an upper portion of the protruding part,
wherein the groove is formed from an inner side surface of the protruding part to an outer side surface of the protruding part,
wherein the main body includes a first main body disposed inside the protruding part and a second main body disposed outside the protruding part based on the protruding part,
wherein the coil is wound around the first main body and then wound around the second main body after passing through the groove,
wherein, as one area of the coil is cut, the coil is divided into a first coil disposed on the first main body and a second coil disposed on the second main body,
wherein two end portions are formed in each of the first coil and the second coil, and
wherein a start line of the first coil and an end line of the second coil are connected to a phase terminal or a neutral terminal when winding directions of the first coil and the second coil are opposite to each other.

* * * * *